(12) United States Patent
Suzuki

(10) Patent No.: US 8,432,573 B2
(45) Date of Patent: Apr. 30, 2013

(54) PRINTER, DEDICATED USB FLASH DRIVE AND PRINTING SYSTEM

(75) Inventor: Mikitoshi Suzuki, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 302 days.

(21) Appl. No.: 12/970,170

(22) Filed: Dec. 16, 2010

(65) Prior Publication Data

US 2011/0157652 A1    Jun. 30, 2011

(30) Foreign Application Priority Data

Dec. 28, 2009  (JP) ................................ 2009-296894

(51) Int. Cl.
*G06K 15/00* (2006.01)
*G06F 3/12* (2006.01)
*G06F 13/20* (2006.01)

(52) U.S. Cl.
USPC .......................... 358/1.16; 358/1.15; 710/313

(58) Field of Classification Search .................. None
See application file for complete search history.

(56) References Cited

U.S. PATENT DOCUMENTS

| | | | | |
|---|---|---|---|---|
| 2008/0086589 A1* | 4/2008 | Urabe | ........................... | 711/103 |
| 2009/0213421 A1* | 8/2009 | Kato et al. | .................. | 358/1.15 |

FOREIGN PATENT DOCUMENTS

| | | |
|---|---|---|
| EP | 1 484 670 | 12/2004 |
| EP | 2 113 835 | 11/2009 |
| JP | 2005-234809 A | 9/2005 |
| JP | 2008-027213 | 2/2008 |
| JP | 2009-223874 A | 10/2009 |

OTHER PUBLICATIONS

Japanese Office Action issue in JP Application No. 2009-027213 on Feb. 26, 2013.
European Search Report issued in European Application No. 10194975.8 on Jan. 30, 2013.

* cited by examiner

*Primary Examiner* — Thomas Lett
(74) *Attorney, Agent, or Firm* — McCarter & English, LLP

(57) ABSTRACT

A printer includes a processor configured to execute, when a dedicated USB flash drive is plugged in a second USB port, a process of (i') making a USB ordinary storage region in the dedicated USB flash drive recognized as a removable drive while managing an access to the USB ordinary storage region in the dedicated USB flash drive, with respect to a host connected to a first USB port, and to further execute, when the execution file of a second application program is read and executed by the host, processes of (a') renewing a command file in a command-purpose memory region with a command file received from the host; (b') analyzing the command file currently renewed and taking out print data therefrom, and (c') making a printing device execute printing based on the print data currently taken out.

15 Claims, 8 Drawing Sheets

PRINTER, DEDICATED USB FLASH DRIVE AND PRINTING SYSTEM

CROSS-REFERENCE TO RELATED APPLICATION

This application claims priority from the prior Japanese Patent Application No. 2009-296894 filed on Dec. 28, 2009, the disclosure of which is herein incorporated by reference in its entirety.

TECHNICAL FIELD

The disclosure relates to a printer to be connected to a host by way of USB, a dedicated USB flash drive designed to be plugged into the printer and a printing system provided with the printer and the dedicated USB flash drive.

BACKGROUND

There has been conventionally known a printer which can print, using an application program from a host even if the application program and a device driver are not installed in the host.

However, if a user wants to execute the application program in a new specification, the application program needs to be updated.

SUMMARY

The disclosure has been made in view of the above-described problems and an object thereof is, utilizing a technique to make it possible for a printer to print using an application program without installing the application program and a device driver in a host, to successfully make the host execute the application program in a different specification without updating the application program.

To achieve the purpose of the disclosure, according to one aspect of the disclosure, there is provided a printer comprising: a first USB port to which a host having an execution file of a first application program is to be connected; memory having an ordinary storage region; a management table arranged outside the ordinary storage region of the memory; a command-purpose memory region being a portion of the ordinary storage region in the memory assigned by the management table and in which a command file capable of including print data created by the first application program is to be written; a printing device configured to execute printing based on the print data in the command file written in the command-purpose memory region; a second USB port capable of receiving one of a USB flash drive and a dedicated USB flash drive plugged therein; and a processor configured to control the printing device, the memory and one of the USB flash drive and the dedicated USB flash drive plugged in the second USB port, wherein the dedicated USB flash drive comprises: a USB ordinary storage region; and an application-purpose USB memory region being a portion of the USB ordinary storage region assigned thereto, and storing an execution file of a second application program therein, wherein the processor executes: when the dedicated USB flash drive is not plugged in the second USB port, while using the management table, a process of: (i) managing an access to the ordinary storage region in the memory with respect to the host connected to the first USB port; and when the execution file of the first application program is executed by the host, processes of: (a) renewing the command file in the command-purpose memory region with a command file received from the host; and (b) analyzing the command file currently renewed and taking out the print data therefrom, wherein the processor further executes, when the dedicated USB flash drive is plugged in the second USB port, a process of: (i') making the USB ordinary storage region in the dedicated USB flash drive recognized as a removable drive while managing an access to the USB ordinary storage region in the dedicated USB flash drive, with respect to the host connected to the first USB port, and wherein the processor further executes, when the execution file of the second application program is read and executed by the host, processes of: (a') renewing the command file in the command-purpose memory region with a command file received from the host; (b') analyzing the command file currently renewed and taking out the print data therefrom; and (c') making the printing device execute printing based on the print data currently taken out.

To achieve the purpose of the disclosure, according to another aspect of the disclosure, there is provided a dedicated USB flash drive configured to be plugged into a printer to which a host having an execution file of a first application file is connected, the dedicated USB flash drive comprising: a USB ordinary storage region; and an application-purpose USB memory region being a portion of the USB ordinary storage region assigned thereto and storing an execution file of a second application program therein, wherein the printer comprises: a first USB port to which the host is connected; memory having an ordinary storage region; a management table arranged outside the ordinary storage region of the memory; a command-purpose memory region being a portion of the ordinary storage region in the memory assigned by the management table and in which a command file capable of including print data created by the first application program is to be written; a printing device configured to execute printing based on the print data in the command file written in the command-purpose memory region; a second USB port; and a processor configured to control the printing device, the memory and a USB flash drive plugged in the second USB port, wherein the processor executes: when the dedicated USB flash drive is not plugged in the second USB port, while using the management table, a process of: (i) managing an access to the ordinary storage region in the memory with respect to the host connected to the first USB port; and when the execution file of the first application program is executed by the host, processes of: (a) renewing the command file in the command-purpose memory region with a command file received from the host; and (b) analyzing the command file currently renewed and taking out the print data therefrom, wherein the processor further executes, when the dedicated USB flash drive is plugged in the second USB port, a process of: (i') making the USB ordinary storage region in the dedicated USB flash drive recognized as a removable drive while managing an access to the USB ordinary storage region in the dedicated USB flash drive, with respect to the host connected to the first USB port, and wherein the processor further executes, when the execution file of the second application program is read and executed by the host, processes of: (a') renewing the command file in the command-purpose memory region with a command file received from the host; (b') analyzing the command file currently renewed and taking out the print data therefrom; and (c') making the printing device execute printing based on the print data currently taken out.

To achieve the purpose of the disclosure, according to yet another aspect of the disclosure, there is provided a printing system configured with a printer and a dedicated USB flash drive, wherein the printer comprises: a first USB port to which a host having an execution file of a first application program is to be connected; memory having an ordinary storage region; a management table arranged outside the ordinary storage region of the memory; a command-purpose memory region being a portion of the ordinary storage region in the memory assigned by the management table and in which a command file capable of including print data created by the first application program is to be written; a printing device configured to execute printing based on the print data in the command file written in the command-purpose memory region; a second USB port; and a processor configured to control the printing device, the memory and a USB flash drive plugged in the second USB port, wherein the dedicated USB flash drive comprises: a USB ordinary storage region; and an application-purpose USB memory region being a portion of the USB ordinary storage region assigned thereto, and storing an execution file of a second application program therein, wherein the processor executes: when the dedicated USB flash drive is not plugged in the second USB port, while using the management table, a process of: (i) managing an access to the ordinary storage region in the memory with respect to the host connected to the first USB port; and when the execution file of the first application program is executed by the host, processes of: (a) renewing the command file in the command-purpose memory region with a command file received from the host; and (b) analyzing the command file currently renewed and taking out the print data therefrom, wherein the processor further executes, when the dedicated USB flash drive is plugged in the second USB port, a process of: (i') making the USB ordinary storage region in the dedicated USB flash drive recognized as a removable drive while managing an access to the USB ordinary storage region in the dedicated USB flash drive, with respect to the host connected to the first USB port, and wherein the processor further executes, when the execution file of the second application program is read and executed by the host, processes of: (a') renewing the command file in the command-purpose memory region with a command file received from the host; (b') analyzing the command file currently renewed and taking out the print data therefrom; and (c') making the printing device execute printing based on the print data currently taken out.

DETAILED DESCRIPTION

A detailed description of an exemplary embodiment of a printing system of the disclosure will now be given referring to the accompanying drawings.

[1. System Configuration of the Present Disclosure]

Figure 2:
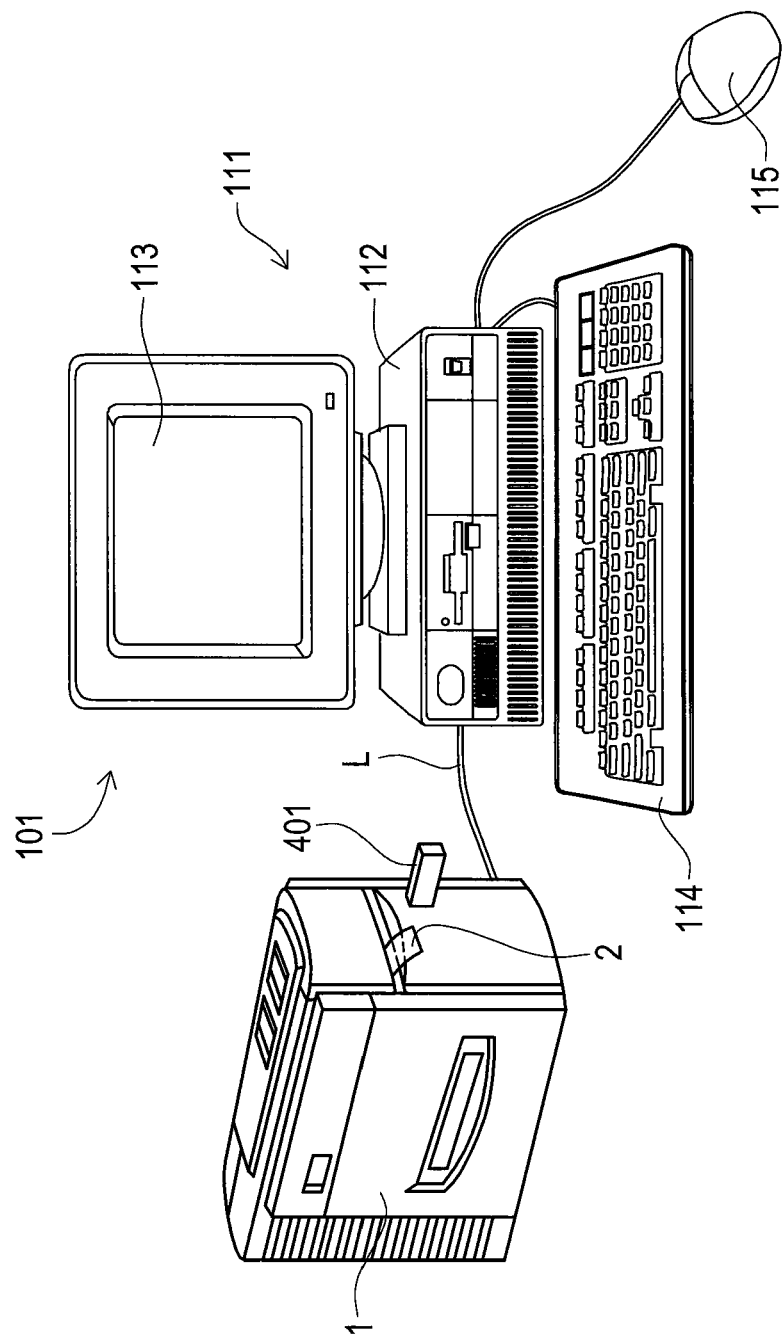
FIG. 2 is a view of the printer in the printing system, being connected with a personal computer and the USB flash drive.

An embodiment of the disclosure is described below with reference to the accompanying drawings. As illustrated in FIG. 2, in the present embodiment, a printing system 101 is configured with a printer 1 being connected to a personal computer 111 by way of a USB cable L.

In this regard, the printer 1 of the embodiment is what is called a label printer for printing on a printing tape 2 and of such a compact size as to be placed on an office desk or the like and thus being portable.

Further, a USB flash drive 401 can be plugged into the printer 1 of the embodiment.

The personal computer 111 is a host of the printing system 101, and is a desktop computer including a main body 112, a display 113, a keyboard 114, a mouse 115, and others.

[2. Internal Configuration of the Present Disclosure]

Figure 3:
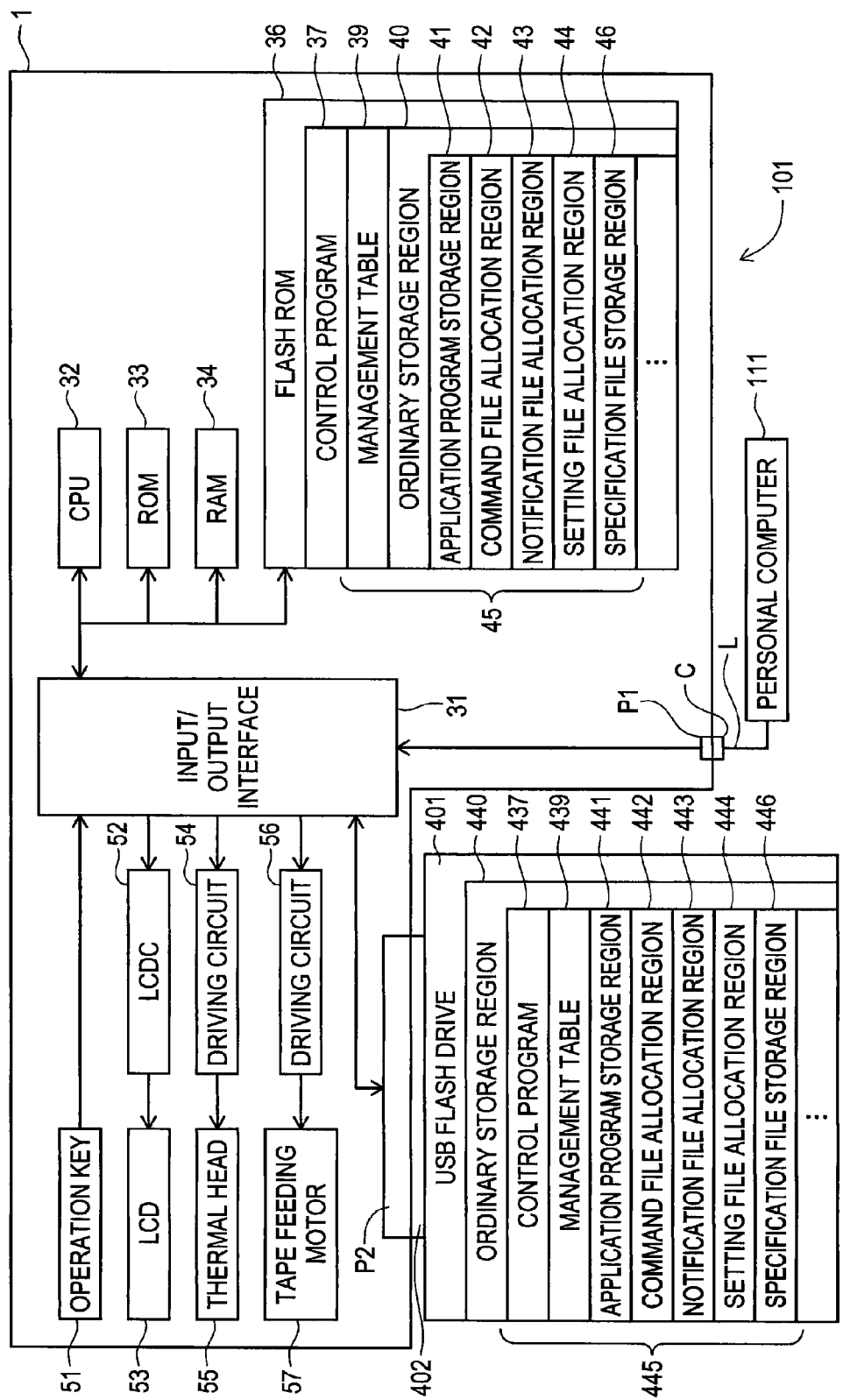
FIG. 3 is a block diagram of an internal configuration of the printer in the printing system and the USB flash drive.

The internal configuration of the printer 1 and the USB flash drive 401 of the printing system 101 of the embodiment is described with reference to FIG. 3. As illustrated in FIG. 3, the printer 1 of the embodiment includes an operation key 51, a display controller (hereinafter, referred to as an LCDC) 52, two driving circuits 54 and 56, a first USB port P1, a second USB port P2 and others, connected to an input/output interface 31.

The operation key 51 is operated by a user to input control signals for causing various desired operations to a CPU 32.

The LCDC 52 has an LCD 53 connected thereto, and this LCD 53 is provided with a display RAM for displaying display data.

The driving circuit 54 is connected to a thermal head 55, and drives the thermal head 55 when printing print data on a printing tape 2.

The driving circuit 56 is connected to a tape feeding motor 57, and drives this tape feeding motor 57 when discharging the printing tape 2 to the outside.

A connector C of the USB cable L is attached to and detached from the first USB port P1.

When the connector C of the USB cable L is inserted into this first USB port P1, the personal computer 111 can be connected to the printer 1 of the printing system 101 directed to the embodiment by USB connection.

In the printer 1 of the printing system 101 directed to the embodiment, the CPU 32, ROM 33, RAM 34, FLASH ROM 36 and others are connected to the input/output interface 31.

The CPU 32 is for executing later-described programs and others, and includes built-in cache memory and others in which control programs other than those for printing are stored.

Further, by executing a control program 37 to be later described, the CPU 32 can operate the driving circuits 54 and 56 and others to print on the printing tape 2 the print data stored in an ordinary storage region 40 to be later described while discharging the printing tape 2 to the outside.

The ROM 33 stores control programs other than those for printing.

The RAM 34 provides a working region when executing various control programs by the CPU 32.

The FLASH ROM 36 stores the control program 37 relating to printing, a management table 39 and others, and is further provided with the ordinary storage region 40 and others.

In addition, the ordinary storage region 40 is provided with an application program storage region 41, a command file allocation region 42, a notification file allocation region 43, a setting file allocation region 44, a specification file storage region 46 and others.

The management table 39 manages the writing into the ordinary storage region 40 in the FLASH ROM 36 by a USB standard, and causes the personal computer 111 connected to the first USB port P1 to recognize the ordinary storage region 40 in the FLASH ROM 36 as a removable drive.

Figure 4:
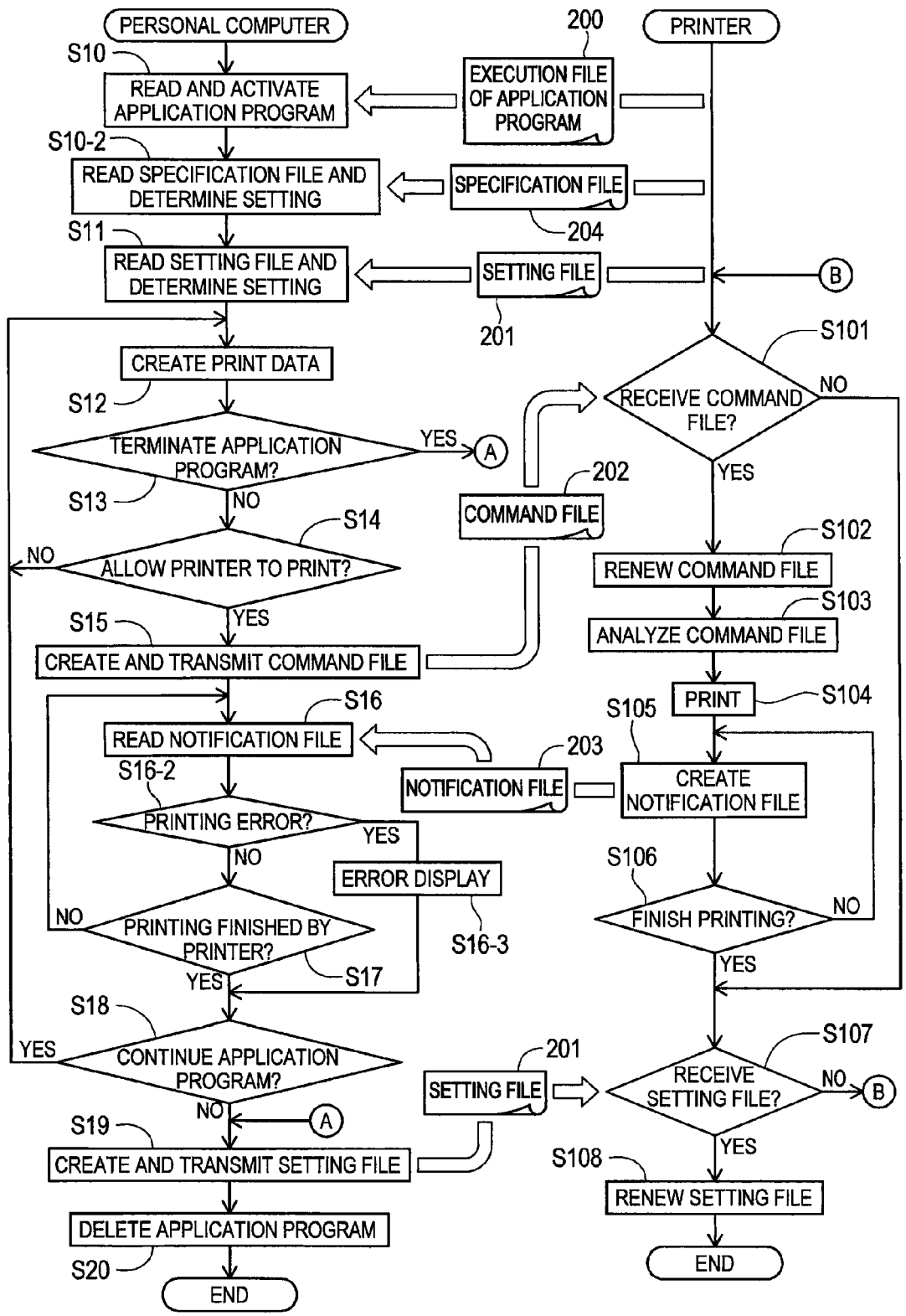
FIG. 4 is a flowchart of a program that controls operations of the printer in the printing system in accordance with operations of the personal computer.

The application program storage region 41 is a portion of the ordinary storage region 40 in the FLASH ROM 36 fixedly assigned, storing an execution file of a first application program as an execution file 200 of an application program (see FIG. 4 to be later described).

Accordingly, the first application program is firmware for the printer 1.

The first application program here indicates software developed as a special editor for the printer 1 of the printing system 101 directed to the embodiment.

The command file allocation region 42 is a portion of the ordinary storage region 40 in the FLASH ROM 36 assigned by the management table 39 and is configured to store a command file 202 (see FIG. 4 to be later described).

The command file 202 (see FIG. 4 lo be later described) here is created by the above-described first application program and the later-described second application program, includes a print command, and further, includes print data created by the above-described first application program and the later-described second application program.

The notification file allocation region 43 is a portion of the ordinary storage region 40 in the FLASH ROM 36 assigned by the management table 39 and is configured to store a notification file 203 (see FIG. 4 to be later described).

The notification file 203 (see FIG. 4 to be later described) includes status information of the printer 1 of the printing system 101 directed to the embodiment.

The setting file allocation region 44 is a portion of the ordinary storage region 40 in the FLASH ROM 36 assigned by the management table 39 and is configured to store a setting file 201 (see FIG. 4 to be later described).

The setting file 201 (see FIG. 4 to be later described) is created by the above-described first application program and the later-described second application program and includes setting information showing the usage environment set by the user in the above-described first application program and the later-described second application program.

Therefore, in the FLASH ROM 36, the management table 39 and the ordinary storage region 40 function as a mass storage area 45 of the USB standard.

The specification file storage region 46 is a portion of the ordinary storage region 40 in the FLASH ROM 36 assigned by the management table 39 and is configured to store a specification file 204 (see FIG. 4 to be later described).

The specification file 204 (see FIG. 4 to be later described) is used at the above-described first application program and the later-described second application program, and includes specification information related to the major specifications of the printer 1 (for example, the types of printable tape widths of print tape 2).

Further, as illustrated in FIG. 3, a connector 402 of the USB flash drive 401 is plugged in/out from the second USB port P2.

Accordingly, through insertion of the connector 401 of the USB flash drive 401, the USB flash drive 401 can be connected to the printer 1 of the printing system 101 directed to the embodiment by USB connection.

The USB flash drive 401 is provided with an ordinary storage region 440 and others.

In addition, the USB flash drive 401 is provided with a control program 437 relating to printing, a management table 439, an application program storage region 441, a command file allocation region 442, a notification file allocation region 443, a setting file allocation region 444, a specification file storage region 446 and others.

The management table 439 manages the writing into the ordinary storage region 440 in the USB flash drive 401 by a USB standard, and causes the personal computer 111 connected to the first USB port P1 to recognize the ordinary storage region 440 in the USB flash drive 401 as a removable drive.

The application program storage region 441 is a portion of the ordinary storage region 440 in the USB flash drive 401 fixedly assigned, storing an execution file of a second application program as an execution file 200 of an application program (see FIG. 4 to be later described).

The second application program here indicates software developed as a special editor for the printer 1 of the printing system 101 directed to the embodiment, but has a specification suitable for purposes different from those of the first application program.

The second application program may be an upgraded version of the first application program.

The command file allocation region 442 is a portion of the ordinary storage region 440 in the USB flash drive 401 assigned by the management table 439 and is configured to store a command file 202 (see FIG. 4 to be later described).

The notification file allocation region 443 is a portion of the ordinary storage region 440 in the USB flash drive 401 assigned by the management table 439 and is configured to store a notification file 203 (see FIG. 4 to be later described).

The setting file allocation region 444 is a portion of the ordinary storage region 440 in the USB flash drive 401 assigned by the management table 439 and is configured to store a setting file 201 (see FIG. 4 to be later described).

Therefore, in the USB flash drive 401, the ordinary storage region 440 functions as a mass storage area 445 of the USB standard.

The specification file storage region 446 is a portion of the ordinary storage region 440 in the USB flash drive 401 assigned by the management table 439 and is configured to store a specification file 204 (see FIG. 4 to be later described).

[3. Operation of the Present Application]

Next, operations of the printing system 101 of the embodiment will now be described referring to FIGS. 1 and 4.

Figure 1:
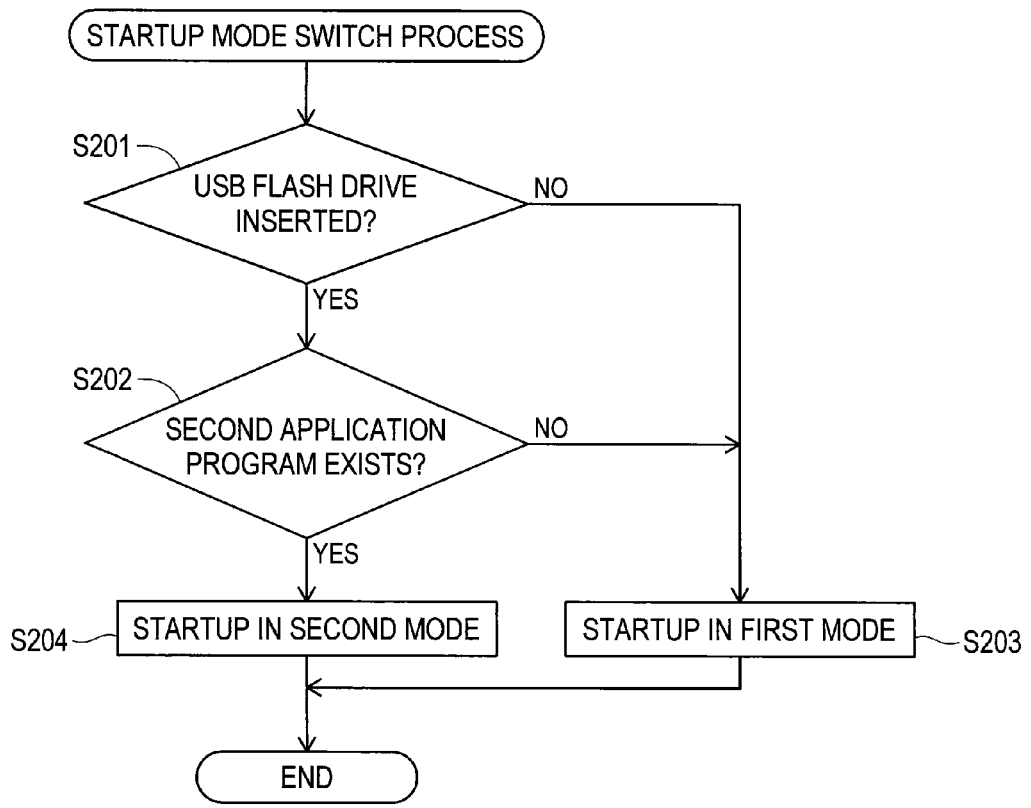
FIG. 1 is a flowchart of a program that controls operations of a printer in a printing system directed to an embodiment of the present application in accordance with a USB flash drive.

First, the operations of the printer 1 as illustrated in FIG. 1 will be described.

A startup mode switch process as illustrated in the flowchart of FIG. 1 is executed at the printer 1. The program for the startup mode switch process is stored in the ROM 33, and the CPU 32 reads the above program into the cache memory therein to execute.

First, the CPU 32 determines at S201 whether or not a USB flash drive is plugged in the second USB port P2. Here, if no USB flash drive is plugged in the second USB port P2 (NO at S201), the process shifts to S203 to be later described. Whereas if a USB flash drive is plugged in the second USB port P2 (YES at S201), the process shifts to S202.

At S202, the CPU 32 determines whether or not there is the above-described second application program in the USB flash drive plugged in the second USB port P2. Here, if there is no second application program in the USB flash drive plugged in the second USB port P2 (NO at S202), the process shifts to S203 to be later described.

Whereas if the USB flash drive plugged in the second USB port P2 is the USB flash drive 401, the above-described second application program is stored in the application program storage region 441 of the USB flash drive 401. This means that there is the second application program in the USB flash drive plugged in the second USB port P2. In this case (YES at S202), the process shifts to S204 to be later described.

At S203, the CPU 32 activates the printer 1 in the first mode.

In the first mode, after a reset process, the CPU 32 uses the management table 39 in the FLASH ROM 36 and thereby the personal computer 111 which is USB-connected to the printer 1 is made to recognize the ordinary storage region 40 in the FLASH ROM 36 of the printer 1 as a removable drive.

The startup mode switch process as illustrated in the flowchart of FIG. 1 is then terminated.

At S204, the CPU 32 activates the printer 1 in the second mode.

In the second mode, after a reset process, the CPU 32 uses the management table 439 in the USB flash drive 401 and thereby the personal computer 111 which is USB-connected to the printer 1 is made to recognize the ordinary storage region 440 in the USB flash drive 401 as a removable drive.

The startup mode switch process as illustrated in the flowchart of FIG. 1 is then terminated.

Next, the operations of the personal computer 111 and the printer 1 illustrated in FIG. 4 will be discussed.

As described in FIG. 1 above, when USB-connected to the printer 1, the personal computer 111 recognizes the ordinary storage region 40 in the FLASH ROM 36 of the printer 1 activated in the first mode as a removable drive (see S203 in FIG. 1 above), whereas the personal computer 111 recognizes the ordinary storage region 440 in the USB flash drive 401 of the printer 1 activated in the second mode as a removable drive (see S204 in FIG. 1 above).

Then, if the printer 1 is activated at the first mode in the personal computer 111 at S10, a user accesses, by a usual operation, the application program storage region 41, which is an assigned portion of the ordinary storage region 40 in the FLASH ROM 36 of the printer 1, and the execution file of the first application program stored in the application program storage region 41 is read and activated as the execution file 200 of the application program.

Meanwhile, if the printer 1 is activated at the second mode, a user accesses, by a usual operation, the application program storage region 441, which is an assigned portion of the ordinary storage region 440 in the USB flash drive 401 of the printer 1, and the execution file of the second application program stored in the application program storage region 441 is read and activated as the execution file 200 of the application program.

At S10-2, the personal computer 111 executes the following operations with the application program. That is, if the application program is the first application program, the personal computer 111 reads the specification file 204 from the specification storage region 46 which is an assigned portion of the ordinary storage region 40 in the FLASH ROM 36 of the printer 1.

Then, the personal computer 111 sets (changes) a user interface, etc. of the first application program according to the specification information of the printer 1 included in the read specification file 204.

Whereas if the application program is the second application program, the personal computer 111 reads the specification file 204 from the specification storage region 446 which is an assigned portion of the ordinary storage region 440 in the USB flash drive 401 of the printer 1.

Then, the personal computer 111 sets (changes) a user interface, etc. of the second application program according to the specification information of the printer 1 included in the read specification file 204.

Figure 5:
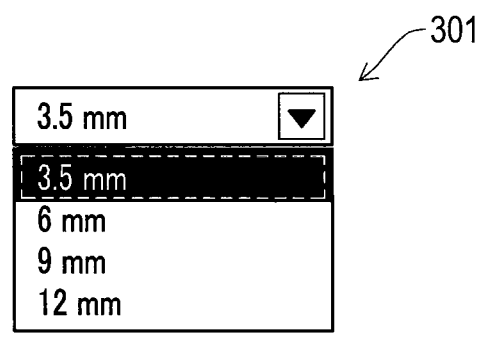
FIG. 5 is a view of a combo box used at a special editor of the printer in the printing system.

Accordingly, if the specification file 204 includes, for example, information related to four types of the printable tape widths of print tape 2 (3.5 mm, 6 mm, 9 mm and 12 mm) as the specification information of the printer 1, a combo box 301 illustrated in FIG. 5 is displayed on the display 113 of the personal computer 111 as a user interface of the first or second application program.

The user can choose one among the four types of the printable tape widths of print tape 2 of the printer 1, that is, 3.5 mm, 6 mm, 9 mm and 12 mm, at the combo box 301.

Figure 6:
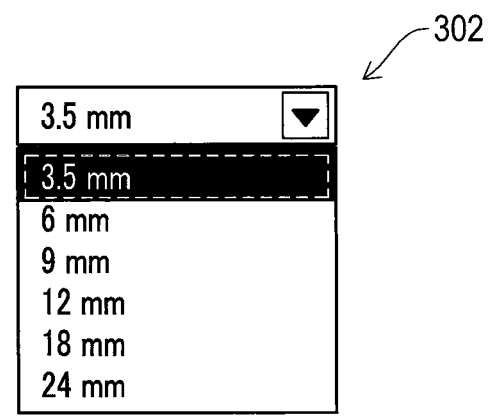
FIG. 6 is a view of a combo box used at the special editor of the printer in the printing system.

Meanwhile, if the specification file 204 includes, for example, information related to six types of the printable tape widths of print tape 2 (3.5 mm, 6 mm, 9 mm, 12 mm, 18 mm and 24 mm) as the specification information of the printer 1, a combo box 302 illustrated in FIG. 6 is displayed on the display 113 of the personal computer 111 as a user interface of the first or second application program.

The user can choose one among the six types of the printable tape widths of print tape 2 of the printer 1, that is, 3.5 mm, 6 mm, 9 mm, 12 mm, 18 mm and 24 mm, at the combo box 302.

Further, at S11, in the personal computer 111, the following operation is executed by the application program. That is, if the application program is the first application program, the setting file 201 is read from the setting file allocation region 44 which is an assigned portion of the ordinary storage region 40 in the FLASH ROM 36 of the printer 1.

The usage environment, etc. of the first application program are set based on the setting information of the application program included in the read setting file 201.

Meanwhile, if the application program is the second application program, the setting file 201 is read from the setting file allocation region 444 which is an assigned portion of the ordinary storage region 440 in the USB flash drive 401 of the printer 1.

The usage environment, etc. of the second application program are set based on the setting information of the application program included in the read setting file 201.

In the personal computer 111, at S12, the user creates print data to be printed at the printer 1, using the special editor which is the first or second application program.

At S13, the personal computer 111 determines whether to terminate the first or second application program or not.

This determination is done based on an input of the user at the first or second application program.

Here, if it is determined to terminate the first or second application program (YES at S13), the process shifts to S19 to be later described.

If it is determined to continue the first or second application program (NO at S13), the process shifts to S14.

At S14, the personal computer 111 determines whether to allow the printer 1 to print or not.

This determination is also done based on an input of the user at the first or second application program.

Here, if it is determined not to allow the printer 1 to print yet (NO at S14), the process returns to the above S12.

If it is determined to allow the printer 1 to print (YES at S14), the process shifts to S15.

At S15, the personal computer 111 executes the following operations by the first or second application program.

That is, the personal computer 111 creates the command file 202 which includes a print command to the printer 1, print data created with the first or second application program, etc.

Further, the personal computer 111 transmits the created command file 202 to the printer 1.

At S16, the personal computer 111 executes the following operation by the application program.

That is, if the application program is the first application program, the personal computer 111 reads the notification file 203 from the notification file allocation region 43 which is an assigned portion of the ordinary storage region 40 in the FLASH ROM 36 of the printer 1.

Then the process shifts to S16-2.

Meanwhile, if the application program is the second application program, the personal computer 111 reads the notification file 203 from the notification file allocation region 443 which is an assigned portion of the ordinary storage region 440 in the USB flash drive 401 of the printer 1.

Then the process shifts to S16-2.

At S16-2, it is determined whether the notification file 203 includes status information of a printing error or not.

Here, if the status information of the printing error is included in the notification file 203 (YES at S16-2), the process shifts to S16-3.

At S16-3, the printing error is displayed at LCD53.

After that, the process shifts to S18 below.

If the notification file 203 includes no status information of a printing error (NO at S16-2), the process shifts to S17.

At S17, the personal computer 111 executes the following operation by the first or second application program.

That is, the personal computer 111 determines whether or not the printer 1 has finished printing the print data included in the command file 202 transmitted at the above S15. This determination is done based on the status of the printer 1 detected from the status information included in the notification file 203 which is read at the above S16.

Here, if the printing has not been finished (NO at S17), the process returns to the above S16.

If the printing has been finished (YES at S17), the process shifts to S18.

At S18, the personal computer 111 determines whether to continue the first or second application program or not.

This determination is done based on an input by the user at the first or second application program.

Here, if it is determined to continue the first or second application program (YES at S18), the process returns to the above S12.

If it is determined to terminate the first or second application program (NO at S18), the process shifts to S19.

At S19, the personal computer 111 executes the following operations by the first or second application program.

That is, the personal computer 111 creates the setting file 201 which includes setting information showing the usage environment of the application set by the user while the first or second application is activated, etc. Further, the personal computer 111 transmits the created setting file 201 to the printer 1.

At S20, the personal computer 111 terminates the first or second application program, and deletes the first or second application program.

As a result, the first or second application program does not remain in the personal computer 111.

Meanwhile, a program controlling the operations of S101 to S108 is executed at the printer 1 when USB-connected to the personal computer 111.

The program is stored in the ROM 33, and the CPU 32 reads the program into the cache memory therein to execute.

First, at S101, the CPU 32 determines whether or not the command file 202 is received from the personal computer 111.

Here, if the command file 202 has not been received from the personal computer 111 (NO at S101), the process shifts to S107 to be later described.

If the command file 202 has been received from the personal computer 111 (YES at S101), the process shifts to S102.

At S102, if the printer 1 is activated in the first mode, the CPU 32 overwrites and stores the command file 202 into the command file allocation region 42 which is an assigned portion of the ordinary storage region 40 in the FLASH ROM 36, whereas if the printer 1 is activated in the second mode, the CPU 32 overwrites and stores the command file 202 into the command file allocation region 442 which is an assigned portion of the ordinary storage region 440 in the USB flash drive 401.

At S103, if the printer 1 is activated in the first mode, the CPU 32 analyzes the command file 202 overwritten in the command file allocation region 42 which is an assigned portion of the ordinary storage region 40 in the FLASH ROM 36, whereas if the printer 1 is activated in the second mode, the CPU 32 analyzes the command file 202 overwritten in the command file allocation region 442 which is an assigned portion of the ordinary storage region 440 in the USB flash drive 401.

The print data included in the command file 202 is taken out by this analysis.

At S104, the CPU 32 executes printing of the print data taken out from the command file 202 at the above S103 in accordance with the control program 37 relating to printing stored in the FLASH ROM 36, if the printer 1 is activated in the first mode. Meanwhile, the CPU 32 executes the printing in accordance with the control program 437 relating to printing stored in the ordinary storage region 440 of the USB flash drive 401, if the printer 1 is activated in the second mode.

Here, the CPU 32 activates the driving circuits 54, 56 and others.

At S105, the CPU 32 creates the notification file 203 which includes status information showing the current printing status, and, if the printer 1 is activated in the first mode, overwrites and stores the created notification file 203 into the notification file allocation region 43 which is an assigned portion of the ordinary storage region 40 in the FLASH ROM 36, whereas if the printer 1 is activated in the second mode, the CPU 32 overwrites and stores the created notification file 203 into the notification file allocation region 443 which is an assigned portion of the ordinary storage region 440 in the USB flash drive 401.

At S106, the CPU 32 determines whether the printing is finished or not.

Here, if the printing is not yet finished (NO at S106), the process shifts to the above S105.

If the printing is finished (YES at S106), the process shifts to S107.

At S107, the CPU 32 determines whether the setting file 201 is received or not from the personal computer 111.

Here, if the setting file 201 has not been received from the personal computer 111 (NO at S107), the process returns to the above S101.

If the setting file 201 has been received from the personal computer 111 (YES at S107), the process shifts to S108.

At S108, if the printer 1 is activated in the first mode, the CPU 32 overwrites and stores the setting file 201 into the setting file allocation region 44 which is an assigned portion of the ordinary storage region 40 in the FLASH ROM 36, whereas if the printer 1 is activated in the second mode, the CPU 32 overwrites and stores the setting file 201 into the setting file allocation region 444 which is an assigned portion of the ordinary storage region 440 in the USB flash drive 401.

After that, the CPU 32 terminates the present program.

[4. Summary]

As described above in detail, in the printer 1 of the printing system 101 directed to the embodiment, the management table 39 which manages, with the USB standard, the writing into the ordinary storage region 40 in the FLASH ROM 36 is arranged outside the ordinary storage region 40 in the FLASH ROM 36 as illustrated in FIG. 3.

Accordingly, if the USB flash drive 401 is not plugged in the second USB port P2 of the printer 1 (NO at S201, NO at S202) and the printer 1 is activated in the first mode (S203), the management table 39 makes the personal computer 111 which is connected to the first USB port P1 recognize the printer 1 (specifically, the ordinary storage region 40 in the FLASH ROM 36 of the printer 1) as a removable drive which is a USB mass storage class device.

Meanwhile, the management table 439 which manages, with the USB standard, the writing into the ordinary storage region 440 in the USB flash drive 401 is provided in the ordinary storage region 440 in the USB flash drive 401 as illustrated in FIG. 3.

Accordingly, if the USB flash drive 401 is plugged in the second USB port P2 of the printer 1 (YES at S201, YES at S202) and the printer 1 is activated in the second mode (S204), the management table 439 makes the personal computer 111 which is connected to the first USB port P1 recognize the USB flash drive 401 (specifically, the ordinary storage region 440 therein) as a removable drive which is a USB mass storage class device.

Accordingly, with a usual access operation by a user at the personal computer 111, the personal computer 111 can read an execution file 200 of the application program stored as an execution file of the first application program in the application program storage region 41 which is a portion of the ordinary storage region 40 in the FLASH ROM 36, or an execution file 200 of the application program stored as an execution file of the second application program in the application program storage region 441 which is a portion of the ordinary storage region 440 in the USB flash drive 401 (S10).

This enables execution of the first or second application program at the personal computer 111 without installing the first or second application program into the personal computer 111 (S10).

Accordingly, in the embodiment, even if the first application program and a device driver are not installed in the personal computer 111 connected to the first USB port P1 of the printer 1, the personal computer 111 can execute printing at the printer 1 using the first application program.

With regard to this, in the embodiment, although the first application program is firmware of the printer 1, the personal computer 111 can execute the second application program of the USB flash drive 401 as having a different specification from the first application program without updating.

In the present embodiment, the first or second application program creates a command file 202 which can include print data created by the first or second application program on the personal computer 111. If the printer 1 is activated in the first mode (S203), the command file 202 is written into the command file allocation region 42 which is a portion of the ordinary storage region 40 in the FLASH ROM 36, with a usual access from the personal computer 111 (S15, S102). If the printer 1 is activated in the second mode (S204), the command file 202 is written into the command file allocation region 442 which is a portion of the ordinary storage region 440 in the USB flash drive 401 (S15, S102).

If the printer 1 is activated in the first mode (S203), the CPU 32 takes out the print data in the command file 202 written in the command file allocation region 42 which is a portion of the ordinary storage region 40 in the FLASH ROM 36. If the printer 1 is activated in the second mode (S204), the CPU 32 takes out the print data in the command file 202 written in the command file allocation region 442 which is a portion of the ordinary storage region 440 in the USB flash drive 401.

The CPU 32 discharges the print tape 2 to the outside while printing the taken-out print data onto the print tape 2 by activating the driving circuits 54, 56, etc. (S104).

Here, upon receiving, from the personal computer 111, the command file 202 which can include print data created by the first or second application program on the personal computer 111 (S101: YES), if the printer 1 is activated in the first mode (S203), the CPU 32 overwrites and renews the command file 202 into the command file allocation region 42 which is a portion of the ordinary storage region 40 in the FLASH ROM 36 (S102), if the printer 1 is activated in the second mode (S204), the CPU 32 overwrites and renews the command file 202 into the command file allocation region 442 which is a portion of the ordinary storage region 440 in the USB flash drive 401 (S102), then analyzes the renewed command file 202 and takes out the print data (S103).

Accordingly, the printing with the first or second application program used therein can be carried out from the personal computer 111 even if the first or second application program and the device driver therefor are not installed in the personal computer 111.

Moreover, in the printer 1 of the printing system 101 directed to the present embodiment, if the printer 1 is activated in the first mode (S203), the overwriting and renewal of the command file 202 into the command file allocation region 42 which is a portion of the ordinary storage region 40 in the FLASH ROM 36 (S102) triggers the CPU 32 to analyze the renewed command file 202 and to take out the print data (S103), and if the printer 1 is activated in the second mode (S204), the overwriting and renewal of the command file 202 into the command file allocation region 442 which is a portion of the ordinary storage region 440 in the USB flash drive 401 (S102) triggers the CPU 32 to analyze the renewed command file 202 and to take out the print data (S103).

However, if the printer 1 is activated in the first mode (S203), the trigger may be the writing of the command file 202 received from the personal computer 111 into any of the regions which are the portions of the ordinary storage region 40 in the FLASH ROM 36 for renewal of the command file 202 in the command file allocation region 42 which is a portion of the ordinary storage region 40 in the FLASH ROM 36, and if the printer 1 is activated in the second mode (S204), the trigger may be the writing of the command file 202 received from the personal computer 111 into any of the regions which are the portions of the ordinary storage region 440 in the USB flash drive 401 for renewal of the command file 202 in the command file allocation region 442 which is a portion of the ordinary storage region 440 in the USB flash drive 401.

Moreover, in the printer 1 of the printing system directed to the present embodiment, if the printer 1 is activated in the first mode (S203), the notification file allocation region 43 is assigned in a portion of the ordinary storage region 40 in the FLASH ROM 36 of the printer 1 which is recognized by the personal computer 111 as a removable drive which is a USB mass storage class device.

If the printer 1 is activated in the second mode (S204), the notification file allocation region 443 is assigned in a portion of the ordinary storage region 440 in the USB flash drive 401 which is recognized by the personal computer 111 as a removable drive which is a USB mass storage class device.

The notification file 203 including therein the status information of the printer 1 is written in the notification file allocation region 43 or 443.

Accordingly, the personal computer 111 can read the notification file 203 written in the notification file allocation region 43 which is a portion of the ordinary storage region 40 in the FLASH ROM 36, or the notification file 203 written in the notification file allocation region 443 which is a portion of the ordinary storage region 440 in the USB flash drive 401, with a usual access from the personal computer 111 (S16). The personal computer 111 is thus notified of the operational status of the printer 1.

Further, in the printer 1 of the printing system 101 directed to the present embodiment, if the printer 1 is activated in the first mode (S203), the setting file allocation region 44 is assigned in a portion of the ordinary storage region 40 in the FLASH ROM 36 of the printer 1 which is recognized by the personal computer 111 as a removable drive which is a USB mass storage class device.

The setting file 201 including therein the setting information showing the usage environment etc. of the first application set by the user while the first application is activated is written in the setting file allocation region 44.

Accordingly, the setting information of the first application program set at the personal computer 111 is written in the setting file allocation region 44 which is a portion of the ordinary storage region 40 in the FLASH ROM 36 with a usual access from the personal computer 111 (S19, S108).

If the printer 1 is activated in the second mode (S204), the setting file allocation region 444 is assigned in a portion of the ordinary storage region 440 in the USB flash drive 401 which is recognized by the personal computer 111 as a removable drive which is a USB mass storage class device.

The setting file 201 including therein the setting information showing the usage environment etc. of the second application set by the user while the second application is activated is written in the setting file allocation region 444.

Accordingly, the setting information of the second application program set at the personal computer 111 is written in the setting file allocation region 444 which is a portion of the ordinary storage region 440 in the USB flash drive 401 with a usual access from the personal computer 111 (S19, S108).

Thus, even if a different personal computer 111 replaces the current personal computer 111 being USB-connected to the printer 1 of the printing system directed to the present embodiment, the different personal computer 111 can read the setting information of the first application program written on the setting file allocation region 44 which is a portion of the ordinary storage region 40 in the FLASH ROM 36 or the setting information of the second application program written on the setting file allocation region 444 which is a portion of the ordinary storage region 440 in the USB flash drive 401 with a usual access from the different personal computer 111 (S10). Therefore the usability is maintained of the first or second application program to be executed on the different personal computer 111.

Further, in the printer 1 of the printing system directed to the present embodiment, if the printer 1 is activated in the first mode (S203) and if the printer 1 is USB-connected to the personal computer 111, the personal computer 111 recognizes the ordinary storage region 40 in the FLASH ROM 36 of the printer 1 as a removable drive which is a USB mass storage class device.

Here, the specification file storage region 46 is a portion of the ordinary storage region 40 in the FLASH ROM 36 of the printer 1.

Further, the specification file storage region 46 stores the specification file 204 which includes the specification information related to the specifications of the printer 1 (for example, the types of printable tape widths of print tape 2) used at the execution file 200 of the application program (the execution file of the first application program).

Meanwhile, if the printer 1 is activated in the second mode (S204) and if the printer 1 is USB-connected to the personal computer 111, the personal computer 111 recognizes the ordinary storage region 440 in the USB flash drive 401 as a removable drive which is a USB mass storage class device.

Here, the specification file storage region 446 is a portion of the ordinary storage region 440 in the USB flash drive 401.

Further, the specification file storage region 446 stores the specification file 204 which includes the specification information related to the specifications of the printer 1 (for example, the types of printable tape widths of print tape 2) used at the execution file 200 of the application program (the execution file of the second application program).

Accordingly, the personal computer 111 reads the specification file 204 stored in the specification file storage region 46 which is a portion of the ordinary storage region 40 in the FLASH ROM 36 or stored in the specification file storage region 446 which is a portion of the ordinary storage region 440 in the USB flash drive 401 with a usual access from the personal computer 111. Then the specification file 204 is used at the execution file 200 of the application program (S10-2).

As a result, at the execution file 200 of the application program, the personal computer 111 sets (changes) a user interface, etc. of the first or second application program in accordance with the specification file 204 including the specification information concerning specifications of the printer 1 (for example, the types of printable tape widths of print tape 2) therein.

Even if there are plural printers 1 of the printing system 101 directed to the present embodiment with different specifications, the usability becomes always appropriate of the first or second application program executed on the personal computer 111, because, for example, through the setting (changing) of the user interface, etc. like using the combo boxes 301, 302 displayed on the display 113 of the personal computer 111, the behavior of the first or second application program executed on the personal computer 111 can be adjusted to a certain specification of the printer 1 which is USB-connected to the personal computer 111.

Further, the execution file 200 of the application program (the execution file of the first or second application program) and the specification file 204 used by the first or second application program are separately provided for the printer 1 of the printing system 101 directed to the present embodiment.

Here, the specification file 204 includes, as above mentioned, specification information related to the main specifications of the printer 1 (for example, the types of printable tape widths of print tape 2, etc.) therein.

Accordingly, the execution file 200 of the application program (the execution file of the first or second application program) to be used here is created for general purposes.

Thus, when plural printers 1 of the printing system 101 of the present embodiment each with different specifications are offered, the specification file 204 can correspond to any printer 1 of each specification through only replacing the specification file 204 stored in the specification file storage region 46 in the FLASH ROM 36, or the specification file 204 stored in the specification file storage region 446 in the USB flash drive 401, to the appropriate one for each specification. This is convenient also for the offering side itself.

In addition, the specification information of the printer 1 may be information other than the types of printable tape widths of print tape 2.

For example, the specification information may be tape lengths of print tape 2 operable in one print, types of print tape 2 of default setting, the types of print options such as possible number of copies, printable resolution, a flag for determining special button display, and so forth.

As above described, the edit function in the second application program of the USB flash drive 401 can be replaced with a special edit function suitable for a purpose of unique label usage (such as labels for price tags, labels for inventory control, labels for equipment control, etc., for responding to the specific needs of individual users) at the specification file 204 stored in the specification file storage region 446 in the USB flash drive 401. Thereby, only through inserting the above USB flash drive 401 into the second USB port P2 of the printer 1, the second application program suitable for the unique label usage can be executed by the personal computer 111 connected to the first USB port P1 of the printer 1, resulting in improvement in convenience.

Specifically, if plural USB flash drives are provided for such different purposes, respectively, through only inserting a USB flash drive 401 selected depending on a desired purpose into the second USB port P2 of the printer 1, the second application program suitable for the desired purpose can be executed by the personal computer 111 connected to the first USB port P1 of the printer 1, resulting in further improvement in convenience.

Further, the specification information of the printer 1 may be included in the setting file 201 or the notification file 203.

In both cases, the specification information of the printer 1 can be read by the personal computer 111 with a usual access from the personal computer 111, and can be used at the execution file 200 of the application program (the execution file of the first or second application program) (S11 or S16).

The specification file 204 may be read together with the setting file 201 or the notification file 203 when the setting file 201 or the notification file 203 is read by the personal computer 111 with a usual access from the personal computer 111 (S11 or S16).

Alternatively, the specification file 204 may be read by the personal computer 111 when a trouble occurs in the first or second application program executed on the personal computer 111.

[5. Others]

The disclosure is not limited to the foregoing embodiment alone, but may be changed and modified within a scope not departing from the true spirit thereof.

[5-1. Modification Example 1]

Figure 7:
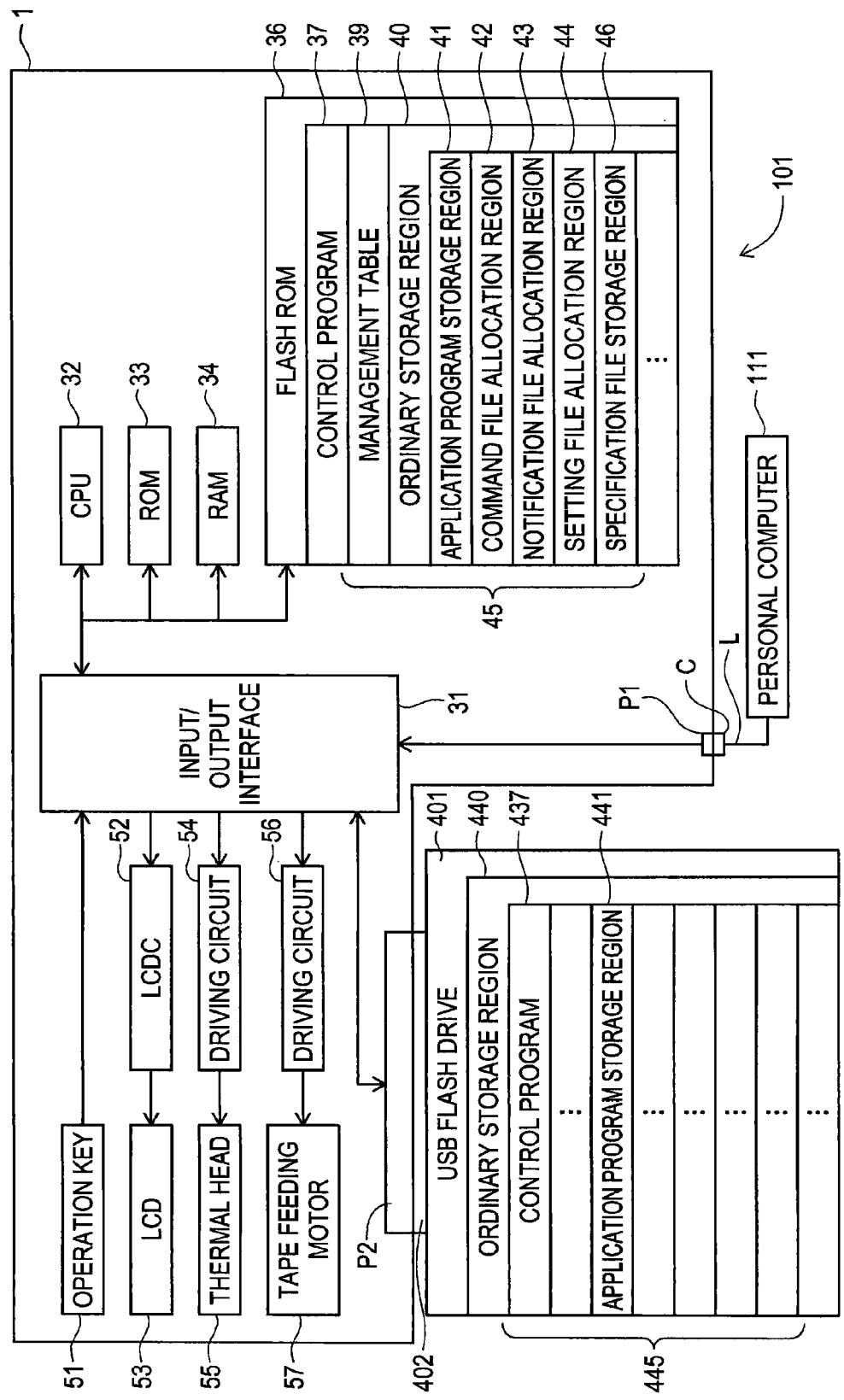
FIG. 7 is a block diagram of an internal configuration of the printer in the printing system and the USB flash drive.

The printer 1 and the USB flash drive 401 in the printing system 101 directed to the present embodiment may have an internal configuration as illustrated in the block diagram of FIG. 7.

Compared with the case in FIG. 3, the case illustrated in FIG. 7 does not include the management table 439, the command file allocation region 442, the notification file allocation region 443, the setting file allocation region 444 and the specification file storage region 446 in the ordinary storage region 440 in the USB flash drive 401.

In the case having the internal configuration illustrated in FIG. 7, when the printer 1 is activated in the second mode (S204), instead of the management table 439 which is not included, the CPU 32 of the printer 1 makes the ordinary storage region 440 in the USB flash drive 401 recognized as a removable drive and at the same time manages the access to the ordinary storage region 440 in the USB flash drive 401.

Then, if the second application program creates a command file 202 which may include print data created at the second application program on the personal computer 111, the CPU 32 of the printer 1 writes the command file 202 in the command file allocation region 42 which is a portion of the ordinary storage region 40 of the FLASH ROM 36 through an usual access from the personal computer 111 (S15, S102), and then causes the print data taken out from the command file 202 (S103) to be printed on the print tape 2 and at the same time causes the print tape 2 to be discharged to the outside (S104).

Here, the notification file 203 which includes the status information of the printer 1 is stored in the notification file storage region 43 which is a portion of the ordinary storage region in the FLASH ROM 36 (S105) and then read out by the personal computer 111 (S16).

Processes concerning the setting file 201 and the specification file 204 (S10-2, S11, S19, S107, S108) are, however, not executed with respect to the second application program.

Meanwhile, if the printer 1 is activated in the first mode (S203), the printer 1 and the personal computer 111 operate in the same manner as in the case having the internal configuration illustrated in FIG. 3.

[5-2. Modification Example 2]

Figure 8:
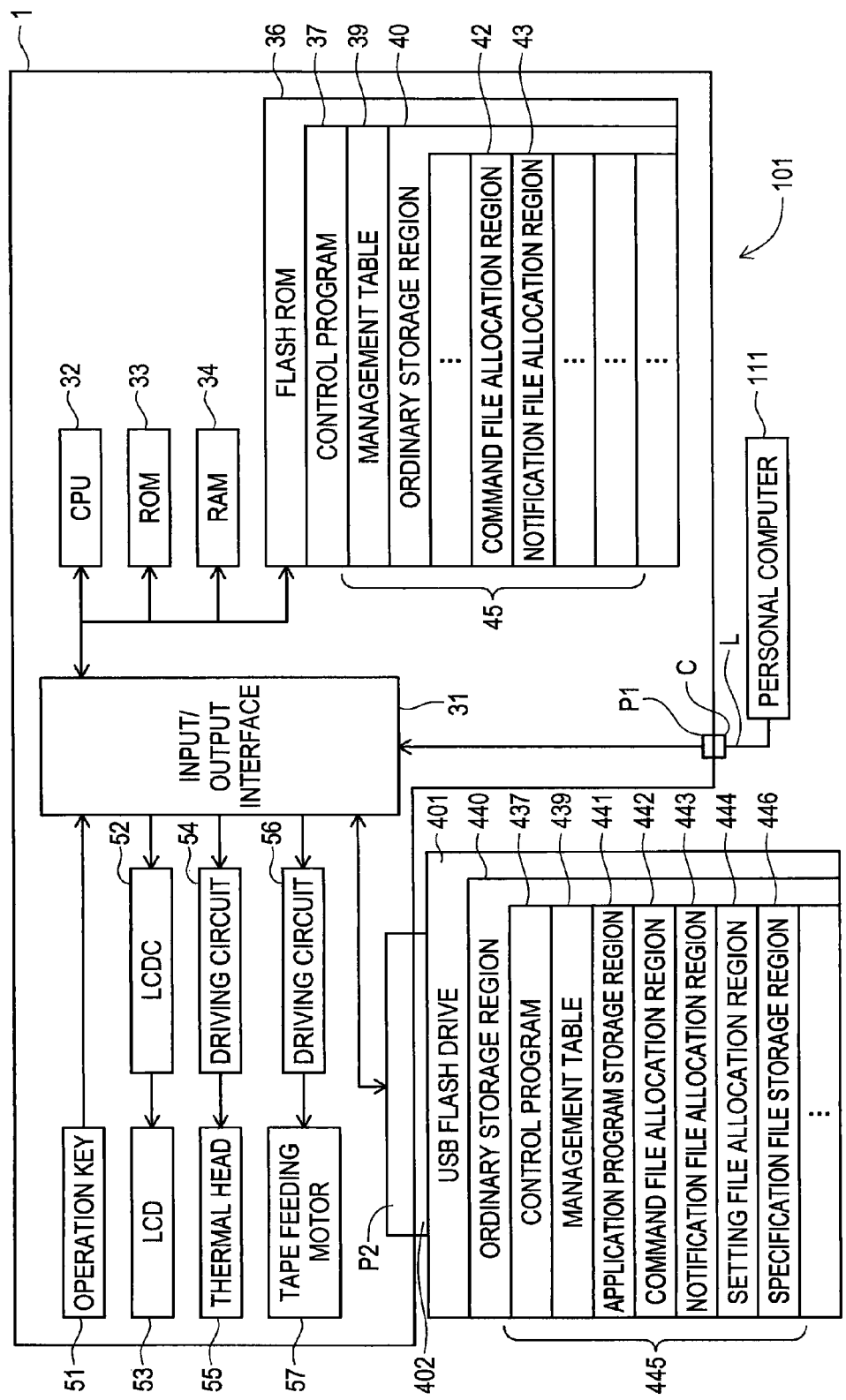
FIG. 8 is a block diagram of an internal configuration of the printer in the printing system and the USB flash drive.

Further, the printer 1 and the USB flash drive 401 in the printing system 101 directed to the present embodiment may have an internal configuration as illustrated in the block diagram of FIG. 8.

Compared with the case in FIG. 3, the case illustrated in FIG. 8 does not include the application program storage region 41, the setting file allocation region 44 and the specification file storage region 46 in the ordinary storage region 40 in the FLASH ROM 36 of the printer 1.

In the case having the internal configuration illustrated in FIG. 8, when the printer 1 is activated in the first mode (S203), the CPU 32 of the printer 1 does not make the personal computer 111 connected to the first USB port P1 recognize the ordinary storage region 40 in the FLASH ROM 36 of the printer 1 as a removable drive, but makes the personal computer 111 recognize the printer 1 as a printer.

Here, the CPU 32 of the printer 1 uses the management table 39 to manage the access to the ordinary storage region 40 in the FLASH ROM 36 regardless of the USB standard.

The execution file 200 of the application program as the execution file of the first application program, the setting file 201 and the specification file 204 are stored in the internal memory or the external memory of the personal computer 111.

Accordingly, processes concerning the execution file 200, the setting file 201 and the specification file 204 (S10, S10-2, S11, S19) are each executed as a process within the personal computer 111.

Thus, the process concerning the setting file 201 (S107, S108) is not executed in the printer 1.

Then, if the first application program creates a command file 202 which may include print data created at the first application program on the personal computer 111, the CPU 32 of the printer 1 writes the command file 202 in the command file allocation region 42 which is a portion of the ordinary storage region 40 of the FLASH ROM 36 through an usual access from the personal computer 111 (S15, S102), and then causes the print data taken out from the command file 202 (S103) to be printed on the print tape 2, and at the same time causes the print tape 2 to be discharged to the outside (S104).

Here, the notification file 203 which includes the status information of the printer 1 is stored in the notification file storage region 43 which is a portion of the ordinary storage region in the FLASH ROM 36 (S105) and then read out by the personal computer 111 (S16).

Whereas if the printer 1 is activated in the second mode (S204), the printer 1, the USB flash drive 401 and the personal computer 111 operate in the same manner as in the case having the internal configuration illustrated in FIG. 3.

[5-3. Modification Example 3]

Figure 9:
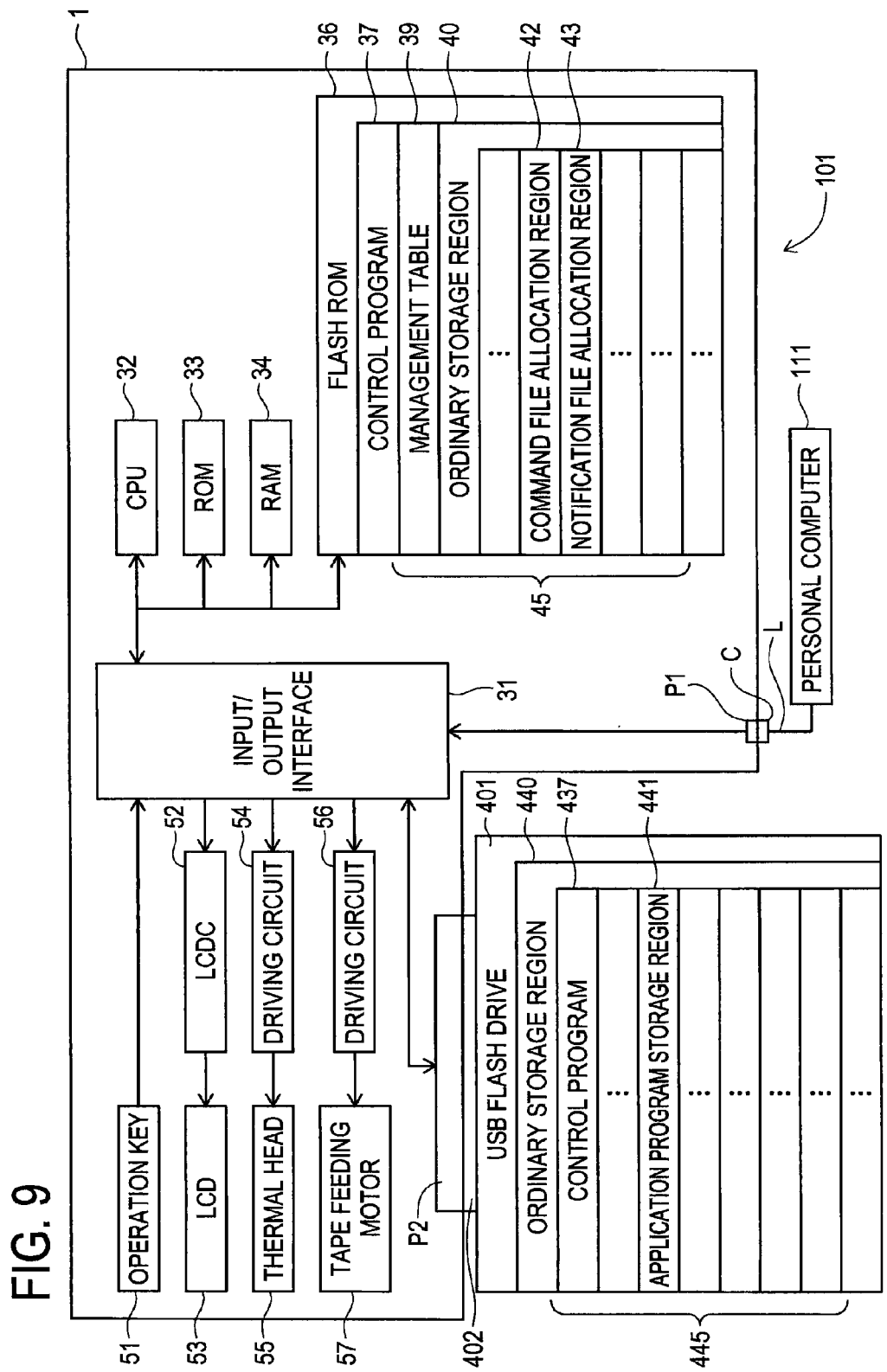
FIG. 9 is a block diagram of an internal configuration of the printer in the printing system and the USB flash drive.

Further, the printer 1 and the USB flash drive 401 in the printing system 101 directed to the present embodiment may have an internal configuration as illustrated in the block diagram of FIG. 9.

Compared with the case in FIG. 3, the case illustrated in FIG. 9 does not include the application program storage region 41, the setting file allocation region 44 and the specification file storage region 46 in the ordinary storage region 40 in the FLASH ROM 36 of the printer 1.

In the case having the internal configuration illustrated in FIG. 9, if the printer 1 is activated in the first mode (S203), the printer 1 and the personal computer 111 operate in the same manner as in the case having the internal configuration illustrated in FIG. 8.

Further, compared with the case in FIG. 3, the case illustrated in FIG. 9 does not include the management table 439, the command file allocation region 442, the notification file allocation region 443, the setting file allocation region 444 and the specification file storage region 446 in the ordinary storage region 440 in the USB flash drive 401.

In the case having the internal configuration illustrated in FIG. 9, if the printer 1 is activated in the second mode (S204), the printer 1, the USB flash drive 401 and the personal computer 111 operate in the same manner as in the case having the internal configuration illustrated FIG. 7.

[5-4. Types of Printers]

For example, the printer 1 of the printing system 101 directed to the embodiment is what is called a label printer for printing on the printing tape 2, but it may also be substituted by a printer for printing on roll or sheet printing paper.

[5-5. Types of Personal Computers]

The personal computer 111 connected to the printer 1 of the printing system 101 directed to the embodiment by way of the first USB port P1 is not particularly specified, and may include a tower type, an all-in-one type, a notebook type personal computer or a huge computer, or it may be connected to another personal computer by LAN or the like.

While the presently exemplary embodiment has been illustrated and described, it is to be understood that this disclosure is for the purpose of illustration and that various changes and modifications may be made without departing from the scope of the disclosure as set forth in the appended claims.

What is claimed is:

1. A printer comprising:
a first USB port to which a host having an execution file of a first application program is to be connected;
memory having an ordinary storage region;
a management table arranged outside the ordinary storage region of the memory;
a command-purpose memory region being a portion of the ordinary storage region in the memory assigned by the management table and in which a command file capable of including print data created by the first application program is to be written;
a printing device configured to execute printing based on the print data in the command file written in the command-purpose memory region;
a second USB port capable of receiving one of a USB flash drive and a dedicated USB flash drive plugged therein; and
a processor configured to control the printing device, the memory and one of the USB flash drive and the dedicated USB flash drive plugged in the second USB port,
wherein the dedicated USB flash drive comprises:
a USB ordinary storage region; and
an application-purpose USB memory region being a portion of the USB ordinary storage region assigned thereto, and storing an execution file of a second application program therein,
wherein the processor executes:
when the dedicated USB flash drive is not plugged in the second USB port, while using the management table, a process of:
(i) managing an access to the ordinary storage region in the memory with respect to the host connected to the first USB port; and
when the execution file of the first application program is executed by the host, processes of:
(a) renewing the command file in the command-purpose memory region with a command file received from the host; and
(b) analyzing the command file currently renewed and taking out the print data therefrom,
wherein the processor further executes, when the dedicated USB flash drive is plugged in the second USB port, a process of:
(i') making the USB ordinary storage region in the dedicated USB flash drive recognized as a removable drive while managing an access to the USB ordinary storage region in the dedicated USB flash drive, with respect to the host connected to the first USB port, and
wherein the processor further executes, when the execution file of the second application program is read and executed by the host, processes of:
(a') renewing the command file in the command-purpose memory region with a command file received from the host;
(b') analyzing the command file currently renewed and taking out the print data therefrom; and
(c') making the printing device execute printing based on the print data currently taken out.

2. The printer directed to claim 1, wherein the dedicated USB flash drive further comprises:
a USB management table arranged within the USB ordinary storage region; and
a command-purpose USB memory region being a portion of the USB ordinary storage region assigned by the USB management table and in which a command file capable of including print data created by the second application program is to be written,
wherein the portion of the USB ordinary storage region is assigned to the application-purpose USB memory region by the USB management table,
wherein, the processor uses the USB management table to execute the process (i'), and
wherein, the processor executes, instead of process (a'), a process of:
(a") renewing the command file in the command-purpose USB memory region with a command file received from the host.

3. The printer directed to claim 2 further comprising:
an application-purpose memory region being a portion of the ordinary storage region in the memory assigned by the management table and storing an execution file of a first application program therein instead of the host, wherein, when executing the process (i), the processor makes the ordinary storage region in the memory recognized as a removable drive with respect to the host connected to the first USB port, and wherein, when the execution file of the first application program is executed by the host, the host reads the execution file of the first application program from the application-purpose memory region before execution.

4. The printer directed to claim 1 further comprising:

an application-purpose memory region being a portion of the ordinary storage region in the memory assigned by the management table and storing an execution file of a first application program therein instead of the host, wherein, when executing the process (i), the processor makes the ordinary storage region in the memory recognized as a removable drive with respect to the host connected to the first USB port, and wherein, when the execution file of the first application program is executed by the host, the host reads the execution file of the first application program from the application-purpose memory region before execution.

5. The printer directed to claim 4, wherein the dedicated USB flash drive further comprises:

a USB management table arranged within the USB ordinary storage region; and a command-purpose USB memory region being a portion of the USB ordinary storage region assigned by the USB management table and in which a command file capable of including print data created by the second application program is to be written, wherein the portion of the USB ordinary storage region is assigned to the application-purpose USB memory region by the USB management table, wherein, the processor uses the USB management table to execute the process (i'), and wherein, the processor executes, instead of process (a'), a process of:

(a") renewing the command file in the command-purpose USB memory region with a command file received from the host.

6. A dedicated USB flash drive configured to be plugged into a printer to which a host having an execution file of a first application file is connected, the dedicated USB flash drive comprising:

a USB ordinary storage region; and an application-purpose USB memory region being a portion of the USB ordinary storage region assigned thereto and storing an execution file of a second application program therein, wherein the printer comprises:

a first USB port to which the host is connected;

memory having an ordinary storage region;

a management table arranged outside the ordinary storage region of the memory;

a command-purpose memory region being a portion of the ordinary storage region in the memory assigned by the management table and in which a command file capable of including print data created by the first application program is to be written;

a printing device configured to execute printing based on the print data in the command file written in the command-purpose memory region;

a second USB port; and a processor configured to control the printing device, the memory and a USB flash drive plugged in the second USB port, wherein the processor executes:

when the dedicated USB flash drive is not plugged in the second USB port, while using the management table, a process of:

(i) managing an access to the ordinary storage region in the memory with respect to the host connected to the first USB port; and when the execution file of the first application program is executed by the host, processes of:

(a) renewing the command file in the command-purpose memory region with a command file received from the host; and (b) analyzing the command file currently renewed and taking out the print data therefrom, wherein the processor further executes, when the dedicated USB flash drive is plugged in the second USB port, a process of:

(i') making the USB ordinary storage region in the dedicated USB flash drive recognized as a removable drive while managing an access to the USB ordinary storage region in the dedicated USB flash drive, with respect to the host connected to the first USB port, and wherein the processor further executes, when the execution file of the second application program is read and executed by the host, processes of:

(a') renewing the command file in the command-purpose memory region with a command file received from the host;

(b') analyzing the command file currently renewed and taking out the print data therefrom; and (c') making the printing device execute printing based on the print data currently taken out.

7. The dedicated USB flash drive directed to claim 6 further comprising:

a USB management table arranged within the USB ordinary storage region; and a command-purpose USB memory region being a portion of the USB ordinary storage region assigned by the USB management table and in which a command file capable of including print data created by the second application program is to be written, wherein the portion of the USB ordinary storage region is assigned to the application-purpose USB memory region by the USB management table, wherein, the processor uses the USB management table to execute the process (i'), and wherein, the processor executes, instead of process (a'), a process of:

(a") renewing the command file in the command-purpose USB memory region with a command file received from the host.

8. The dedicated USB flash drive directed to claim 7, wherein the printer further comprising:

an application-purpose memory region being a portion of the ordinary storage region in the memory assigned by the management table and storing an execution file of a first application program therein instead of the host, wherein, when executing the process (i), the processor makes the ordinary storage region in the memory recognized as a removable drive with respect to the host connected to the first USB port, and wherein, when the execution file of the first application program is executed by the host, the host reads the execution file of the first application program from the application-purpose memory region before execution.

9. The dedicated USB flash drive directed to claim 6, wherein the printer (1) further comprising:
an application-purpose memory region being a portion of the ordinary storage region in the memory assigned by the management table and storing an execution file of a first application program therein instead of the host,
wherein, when executing the process (i), the processor makes the ordinary storage region in the memory recognized as a removable drive with respect to the host connected to the first USB port, and
wherein, when the execution file of the first application program is executed by the host, the host reads the execution file of the first application program from the application-purpose memory region before execution.

10. The dedicated USB flash drive directed to claim 9 further comprising:
a USB management table arranged within the USB ordinary storage region; and
a command-purpose USB memory region being a portion of the USB ordinary storage region assigned by the USB management table and in which a command file capable of including print data created by the second application program is to be written,
wherein the portion of the USB ordinary storage region is assigned to the application-purpose USB memory region by the USB management table,
wherein, the processor uses the USB management table to execute the process (i'), and
wherein, the processor executes, instead of process (a'), a process of:
(a") renewing the command file in the command-purpose USB memory region with a command file received from the host.

11. A printing system configured with a printer and a dedicated USB flash drive,
wherein the printer comprises:
a first USB port to which a host having an execution file of a first application program is to be connected;
memory having an ordinary storage region;
a management table arranged outside the ordinary storage region of the memory;
a command-purpose memory region being a portion of the ordinary storage region in the memory assigned by the management table and in which a command file capable of including print data created by the first application program is to be written;
a printing device configured to execute printing based on the print data in the command file written in the command-purpose memory region;
a second USB port; and
a processor configured to control the printing device, the memory and a USB flash drive plugged in the second USB port,
wherein the dedicated USB flash drive comprises:
a USB ordinary storage region; and
an application-purpose USB memory region being a portion of the USB ordinary storage region assigned thereto, and storing an execution file of a second application program therein,
wherein the processor executes:
when the dedicated USB flash drive is not plugged in the second USB port, while using the management table, a process of:
(i) managing an access to the ordinary storage region in the memory with respect to the host connected to the first USB port; and
when the execution file of the first application program is executed by the host, processes of:
(a) renewing the command file in the command-purpose memory region with a command file received from the host; and
(b) analyzing the command file currently renewed and taking out the print data therefrom,
wherein the processor further executes, when the dedicated USB flash drive is plugged in the second USB port, a process of:
(i') making the USB ordinary storage region in the dedicated USB flash drive recognized as a removable drive while managing an access to the USB ordinary storage region in the dedicated USB flash drive, with respect to the host connected to the first USB port, and
wherein the processor further executes, when the execution file of the second application program is read and executed by the host, processes of:
(a') renewing the command file in the command-purpose memory region with a command file received from the host;
(b') analyzing the command file currently renewed and taking out the print data therefrom; and
(c') making the printing device execute printing based on the print data currently taken out.

12. The printing system directed to claim 11, wherein the dedicated USB flash drive further comprises:
a USB management table arranged within the USB ordinary storage region; and
a command-purpose USB memory region being a portion of the USB ordinary storage region assigned by the USB management table and in which a command file capable of including print data created by the second application program is to be written,
wherein the portion of the USB ordinary storage region is assigned to the application-purpose USB memory region by the USB management table,
wherein, the processor uses the USB management table to execute the process (i'), and
wherein, the processor executes, instead of process (a'), a process of:
(a") renewing the command file in the command-purpose USB memory region with a command file received from the host.

13. The printing system directed to claim 12, wherein the printer further comprises:
an application-purpose memory region being a portion of the ordinary storage region in the memory assigned by the management table and storing an execution file of a first application program therein instead of the host,
wherein, when executing the process (i), the processor makes the ordinary storage region in the memory recognized as a removable drive with respect to the host connected to the first USB port, and
wherein, when the execution file of the first application program is executed by the host, the host reads the execution file of the first application program from the application-purpose memory region before execution.

14. The printing system directed to claim 11, wherein the printer further comprises:
an application-purpose memory region being a portion of the ordinary storage region in the memory assigned by the management table and storing an execution file of a first application program therein instead of the host, wherein, when executing the process (i), the processor makes the ordinary storage region in the memory recognized as a removable drive with respect to the host connected to the first USB port, and wherein, when the execution file of the first application program is executed by the host, the host reads the execution file of the first application program from the application-purpose memory region before execution.

15. The printing system directed to claim 14, wherein the dedicated USB flash drive further comprises:

a USB management table arranged within the USB ordinary storage region; and a command-purpose USB memory region being a portion of the USB ordinary storage region assigned by the USB management table and in which a command file capable of including print data created by the second application program is to be written, wherein the portion of the USB ordinary storage region is assigned to the application-purpose USB memory region by the USB management table, wherein, the processor uses the USB management table to execute the process (i'), and wherein, the processor executes, instead of process (a'), a process of:

(a") renewing the command file in the command-purpose USB memory region with a command file received from the host.

* * * * *